United States Patent
Lüthi et al.

(10) Patent No.: US 9,400,175 B2
(45) Date of Patent: Jul. 26, 2016

(54) LASER DIODE AS INTERFEROMETER-LASER BEAM SOURCE IN A LASER TRACKER

(71) Applicant: LEICA GEOSYSTEMS AG, Heerbrugg (CH)

(72) Inventors: Thomas Lüthi, Aarau (CH); Burkhard Böckem, Rieden AG (CH)

(73) Assignee: LEICA GEOSYSTEMS AG, Heerbrugg (CH)

(*) Notice: Subject to any disclaimer, the term of this patent is extended or adjusted under 35 U.S.C. 154(b) by 98 days.

(21) Appl. No.: 14/356,119

(22) PCT Filed: Nov. 2, 2012

(86) PCT No.: PCT/EP2012/071708
§ 371 (c)(1),
(2) Date: May 2, 2014

(87) PCT Pub. No.: WO2013/064625
PCT Pub. Date: May 10, 2013

(65) Prior Publication Data
US 2014/0307264 A1    Oct. 16, 2014

(30) Foreign Application Priority Data
Nov. 3, 2011 (EP) .................................. 11187614

(51) Int. Cl.
*G01B 11/02* (2006.01)
*G01B 11/14* (2006.01)
(Continued)

(52) U.S. Cl.
CPC ............. *G01B 11/14* (2013.01); *G01B 5/004* (2013.01); *G01B 11/002* (2013.01); *G01C 15/002* (2013.01); *G01S 17/66* (2013.01)

(58) Field of Classification Search
CPC ........ G01B 5/004; G01B 5/008; G01B 5/012; G01B 9/02007; G01B 11/002; G01B 11/14; G01C 15/002; G01S 17/66
See application file for complete search history.

(56) References Cited

U.S. PATENT DOCUMENTS

| | | | |
|---|---|---|---|
| 5,114,226 A | 5/1992 | Goodwin et al. | |
| 5,473,428 A | 12/1995 | Lee et al. | |

(Continued)

FOREIGN PATENT DOCUMENTS

| | | |
|---|---|---|
| DE | 102 35 669 A1 | 2/2004 |
| EP | 0 553 266 B1 | 5/1997 |

(Continued)

OTHER PUBLICATIONS

European Search Report dated Jan. 18, 2012 as received in Application No. EP 11 18 7614.

*Primary Examiner* — Michael A Lyons
(74) *Attorney, Agent, or Firm* — Maschoff Brennan

(57) ABSTRACT

A laser tracker for continuous tracking of a reflecting target and for determining the distance to the target is provided. The laser tracker may include a base defining a standing axis, a beam steering unit for emission of a measuring radiation and for receiving at least a part of the measuring radiation reflected by the target. The beam steering unit is motorized to be pivotable relative to the base around the standing axis and a tilt axis extending substantially orthogonal to the standing axis. Furthermore, the tracker has a distance measuring unit configured as an interferometer for determining a change in distance to the target by means of interferometry, an interferometer laser beam source for generating the measuring radiation for the interferometer and an angle measurement functionality for determining an alignment of the beam steering unit relative to the base. The interferometer laser beam source may be configured as a laser diode.

19 Claims, 4 Drawing Sheets

(51) Int. Cl.
*G01C 15/00* (2006.01)
*G01S 17/66* (2006.01)
*G01B 11/00* (2006.01)
*G01B 5/004* (2006.01)

(56) References Cited

U.S. PATENT DOCUMENTS 7,046,368 B2 5/2006 Holzapfel et al.
7,480,316 B2 1/2009 Braunecker
8,031,331 B2 10/2011 Meier et al.
8,891,069 B2 11/2014 Pedersen et al.
2006/0092428 A1 5/2006 Holzapfel et al.

FOREIGN PATENT DOCUMENTS

| | | |
|---|---|---|
| EP | 1 655 582 A2 | 5/2006 |
| EP | 2 261 601 A1 | 12/2010 |
| JP | 05-312523 A | 11/1993 |
| JP | 2002-039714 A | 2/2002 |
| JP | 2007-114141 A | 5/2007 |
| JP | 2007-533962 A | 11/2007 |
| JP | 2011-503526 A | 1/2011 |
| WO | 03/062744 A1 | 7/2003 |
| WO | 2007/079600 A1 | 7/2007 |

LASER DIODE AS INTERFEROMETER-LASER BEAM SOURCE IN A LASER TRACKER

FIELD OF THE INVENTION

The invention relates to a measuring instrument, in particular a laser tracker, comprising an interferometer with laser diode for determining a change in distance relative to a target, a use of a laser diode having a long coherence length in a corresponding interferometer, and a method for determining a relative distance with respect to the target.

Measuring apparatuses designed for continuously tracking a target point and coordinatively determining the position of said point can generally be combined under the term laser tracker. In this case, a target point can be represented by a retroreflective unit (e.g. cube prism) which is targeted by an optical measurement beam of the measuring apparatus, in particular a laser beam. The laser beam is reflected back to the measuring apparatus in a parallel fashion, the reflected beam being detected by a detection unit of the apparatus. In this case, an emission direction and respectively a reception direction of the beam are ascertained, for example by means of sensors for angle measurement which are assigned to a deflection mirror or a targeting unit of the system. In addition, with the detection of the beam, a distance from the measuring apparatus to the target point is ascertained, e.g. by means of time-of-flight or phase difference measurement or by means of the Fizeau principle, and—increasingly in a standardized manner in modern systems—an offset of the received beam from a zero position is ascertained on a sensor. By means of this offset that is measurable in this way, it is possible to determine a difference in position between the center of a retroreflector and the impingement point of the laser beam on the reflector and it is possible to correct or readjust the alignment of the laser beam depending on this deviation in such a way that the offset on the sensor is reduced, in particular is "zero", and the beam is thus aligned in the direction of the reflector center. As a result of the readjustment of the laser beam alignment, continuous target tracking of the target point can be carried out and the distance and position of the target point can be determined continuously relative to the measuring instrument. The readjustment can be realized in this case by means of a change in alignment of the deflection mirror provided for deflecting the laser beam, said deflection mirror being movable in a motorized manner, and/or by pivoting of the targeting unit having the beam-guiding laser optical unit.

Laser trackers according to the prior art can additionally be embodied with an optical image detection unit with a two-dimensional, light-sensitive array, e.g. a CCD or CID camera or a camera based on a CMOS array, or with a pixel array sensor and with an image processing unit. In this case, the laser tracker and the camera are mounted one on top of another in particular in such a way that their positions cannot be altered relative to one another. The camera is arranged, for example, in a manner rotatable together with the laser tracker about the substantially perpendicular axis thereof, but in a manner pivotable up and down independently of the laser tracker and thus, in particular, separately from the optical unit of the laser beam. In particular, the camera can have a fisheye optical unit and pivoting of the camera can thus be avoided, or the necessity thereof can at least be reduced, on account of a very large image detection range of the camera. Furthermore, the camera—e.g. depending on the respective application—can be embodied as pivotable only about one axis. In alternative embodiments, the camera can be installed in an integrated design together with the laser optical unit in a common housing.

With the detection and evaluation of an image—by means of an image detection and image processing unit—of a so-called auxiliary measuring instrument with markings whose relative position with respect to one another is known, it is thus possible to deduce an orientation of an object (e.g. a probe) arranged on the auxiliary measuring instrument in space. Together with the determined spatial position of the target point, it is furthermore possible to precisely determine the position and orientation of the object in space absolutely and/or relative to the laser tracker.

The object whose position and orientation are measured by means of the measuring instrument mentioned therefore need not be a measuring probe itself, for example, but rather can be the auxiliary measuring instrument. The latter, as part of the measuring system, for the measurement, is brought into a position that is mechanically defined relative to the target object or can be determined during the measurement, wherein, by means of the measured position and orientation of said instrument, it is possible to deduce the position and, if appropriate, the orientation of the measuring probe, for example.

Such auxiliary measuring instruments can be embodied by so-called contact sensing tools that are positioned with their contact point on a point of the target object. The contact sensing tool has markings, e.g. light points, and a reflector, which represents a target point on the contact sensing tool and can be targeted by the laser beam of the tracker, the positions of the markings and of the reflector relative to the contact point of the contact sensing tool being known precisely. The auxiliary measuring instrument can also be, in a manner known to a person skilled in the art, a, for example handheld, scanner equipped for distance measurement for contactless surface measurements, the direction and position of the scanner measurement beam used for the distance measurement relative to the light points and reflectors arranged on the scanner being known precisely. A scanner of this type is described in EP 0 553 266, for example.

For distance measurement, laser trackers from the prior art have at least one distance measuring device, wherein the latter can be embodied e.g. as an interferometer. Since such distance measuring units can measure only relative changes in distance, in addition to interferometers so-called absolute distance measuring devices are installed in present-day laser trackers. By way of example, such a combination of measuring means for determining distance is known from the product LTD500 from Leica Geosystems AG.

The interferometers used for distance measurement in this context use primarily—on account of the long coherence length and the measurement range made possible thereby—HeNe gas lasers as light sources. In this case, the coherence length of the HeNe laser can be a few hundred meters, such that the ranges required in industrial metrology can be obtained with relatively simple interferometer constructions. A combination of an absolute distance measuring device and an interferometer for determining distance with an HeNe laser is known from WO 2007/079600 A1, for example.

What is disadvantageous about the use of HeNe laser light sources with regard to a generally sought miniaturization of laser trackers, however, is their size that determines the light power. In this case, the power of the light source depends significantly on the length of the laser tube, i.e. the longer the tube, the greater the achievable emission power. Moreover, such a laser source usually exhibits a relatively great power dissipation. The high-voltage supply required for operation constitutes a further disadvantage. By way of example, a voltage of approximately 7000V has to be provided to the ignition of the laser and a voltage of approximately 1500V has to be provided during operation, as a result of which, when such light sources are used, special components (e.g. high-voltage power supply unit and shielding) have to be used and safety measures have to be implemented. The sensitivity toward magnetic fields (e.g. generated by internal motors or external welding transformers) and the limited lifetime of the tubes (typically approximately 15 000 operating hours) also make the use of HeNe lasers disadvantageous—for example since the light sources often have to be replaced in the systems in a costly manner.

BACKGROUND

Some embodiments of the present invention provide an improved laser tracker, wherein the means for generating laser radiation for measuring distance are embodied more compactly in their entirety and laser radiation emitted for determining distance can be generated in this case in such a way that a required precision for the distance determination in conjunction with a large measurement range required in the context of an industrial measurement, in particular in conjunction with a minimum range of 10 m, is at least achieved.

Some embodiments of the invention provide a laser tracker having a distance measuring unit that is improved with regard to the space requirement, wherein a required precision in conjunction with a simultaneously required measurement range of at least 10 m for the distance determination is at least maintained.

Some embodiments of the invention provide a laser tracker comprising an interferometer as a distance measuring device, wherein the optical components, in particular the beam source and supply units to be provided therefor, have a significantly smaller space requirement and lower energy consumption by comparison with the prior art.

SUMMARY

The invention relates to a laser tracker for continuously tracking a reflective target and for determining distance with respect to the target comprising a base defining a vertical axis, and a beam directing unit for emitting a measurement radiation and for receiving at least one part of the measurement radiation reflected at the target, wherein the beam directing unit is pivotable in motorized fashion about the vertical axis and an inclination axis, which is substantially orthogonal with respect to the vertical axis, relative to the base. In this case, the vertical axis and the inclination axis are positioned with respect to one another in such a way that an angle of exactly 90° or of approximately 90°, e.g. 88.5°, is present between the axes, wherein a relative axial position can be exactly defined and corresponding position values can be stored in the laser tracker, in particular for a compensation of measurement values. Moreover, the laser tracker has a distance measuring unit embodied as an interferometer, in particular having a defined detector bandwidth, e.g. of 50 MHz, and serving for determining a change in distance with respect to the target by means of interferometry, an interferometer laser beam source for generating the measurement radiation for the interferometer, and an angle measuring functionality for determining an orientation of the beam directing unit relative to the base. In this case, the interferometer laser beam source is embodied as a laser diode wherein the laser diode is furthermore embodied in such a way that the measurement radiation can be generated in longitudinally monomode fashion with a defined emission wavelength and with a coherence length of at least 10 m, in particular wherein the coherence length of at least 10 m can be determined by means of the interferometer. In particular, the laser diode can be embodied in this case in such a way that it is possible to generate the measurement radiation with a coherence length of at least 20 m, in particular at least 50 m.

The laser diode has a wavelength-selective component arranged in such a way that the measurement radiation can be generated in longitudinally monomode fashion with the defined emission wavelength and with the coherence length of at least 10 m.

The use according to the invention of a specific laser diode with the interferometer of the laser tracker affords advantages with regard to the associated space requirement, which turns out to be significantly smaller by comparison with an HeNe gas laser, in conjunction with, however, likewise a long coherence length. Moreover, in contrast to such a gas laser source, which can indeed likewise provide measurement radiation having a suitable coherence length, no high-voltage supply is required for the operation of the diode. Furthermore, laser diodes of this type have a lower energy consumption.

In accordance with one specific embodiment according to the invention of the laser tracker, the laser diode has a first resonator unit, which defines a number of laser modes which can be generated by the laser diode and which arise jointly, wherein, by means of each laser mode, a respectively different mode wavelength is defined and it is possible to generate a diode radiation with the different mode wavelengths. In this case, the wavelength-selective component is furthermore embodied in such a way that it acts as a second resonator unit and a principal laser mode can be extracted from the number of laser modes by means of an interaction of the wavelength-selective component with the laser diode. As a result, the diode radiation can be emitted as longitudinally monomode measurement radiation having only the principal laser mode, such that the emission wavelength and the coherence length of the measurement radiation are defined, in particular wherein the wavelength-selective component is embodied as an optical grating.

The use according to the invention with an interferometer requires a long coherence length of the laser radiation that can be emitted by the diode of a few tens of meters. In order to provide such coherences, the laser diodes or diode lasers which are used in this context according to the invention can have a wavelength-selective apparatus. By way of example,
- a distributed feedback laser (DFB) (having a periodically structured active medium, e.g. grating),
- a distributed Bragg reflector laser (DBR) (having an optical grating outside the active medium but arranged on a common chip),
- fiber Bragg grating laser (FBG) (substantially in accordance with a DFB laser, but with a grating in an external fiber),
- an external cavity diode laser (ECDL) (stabilization of the laser diode by means of an external highly stable cavity e.g. with a holographic grating),
- diode pumped solid state lasers (DPSS),
- discrete mode lasers (DMD) and/or
- a microchip laser can be used as beam sources. In this case, the beam sources are embodied in such a way that the emitted laser beam, with regard to the wavelength, is single-mode with a coherence length of the order of magnitude of a plurality of 10 m (or a line width of <1 MHz). Therefore, in the context of the invention, a wavelength-selective component, in particular an optical grating, can be provided for generating the monomode measurement radiation.

With regard to the wavelength emitted by the diode, emission spectral ranges are advantageous which can lie in the visible optical range, in particular in the "red wavelength range", or in the near infrared range. Consequently, the emission wavelength of the measurement radiation according to the invention can be between 600 nm and 700 nm, in particular between 630 nm and 635 nm, or between 850 nm and 900 nm, in particular between 850 nm and 855 nm or between 892 nm and 896 nm. In one embodiment with an emission wavelength in the visible wavelength range (e.g. between 630 and 635 nm), the emitted red laser light from the diode can be used not only for interferometric measurements but also as marking light. By means of the generation of a red spot on a target object, a targeting point can be made visually visible for example to a user of the laser tracker.

Guiding of the laser diode forms a further aspect of the invention. In this connection, according to the invention the laser tracker can have a control unit, and the laser diode can be embodied in such a way that the emission wavelength of the measurement radiation is variable in longitudinally monomode fashion within a specific emission wavelength range. In this case, the emission wavelength can be variable in a manner controlled by the control unit as a result of a change in the temperature of the laser diode and/or a change in an electric current present at the laser diode. Furthermore, the laser diode can be drivable by means of the control unit in such a way that an emission power of the measurement radiation is variable. Accordingly, the control unit can include a thermoelectric cooler (TEC) or other laser temperature controller to control the temperature of the laser diode and/or a laser driver to drive the laser diode in such a way that an emission power of the measurement radiation is variable.

By virtue of this possibility of varying the wavelength within a specific range, the emitted radiation being present in single-mode fashion, i.e. substantially with a specific, sharply defined wavelength (small line width), it is possible to provide a tunable and, in particular, mode-hop-free wavelength range for the emission wavelength. By means of this specific range, the radiation can additionally be tuned to an absorption line defined by a wavelength stabilization unit.

According to the invention, for this purpose, the laser tracker has a wavelength stabilization unit for stabilizing the measurement radiation generated by the laser diode, such that the emission wavelength is present continuously within a defined wavelength range, in particular wherein the wavelength stabilization unit is embodied as an absorption cell. Such a stabilization can be advantageous for the use of the laser diode as a light source for the interferometer or can be necessary depending on the beam quality of the source. By way of example, the wavelength stabilization unit can be embodied as an external gas cell having a defined absorption line (absorption cell) (e.g. iodine cell for 633 nm).

Furthermore, according to the invention, the laser tracker can have an optical connecting fiber for connecting the wavelength stabilization unit to the interferometer laser beam source. In this regard, the radiation generated by means of the laser beam source can be guided to the wavelength stabilization unit by means of the connecting fiber and coupled into said wavelength stabilization unit.

With regard to the guidance of the measurement radiation proceeding from the generating beam source toward the beam directing unit and emission that subsequently takes place, according to the invention, the laser tracker can generally have at least one optical fiber, wherein the measurement radiation can be guided by means of the optical fiber, in particular can be guided to the interferometer, in particular wherein the measurement radiation that can be generated by the laser diode is coupled into the optical fiber. In addition, it is thus possible that the measurement radiation can be coupled into the beam directing unit by means of the optical fiber.

By means of the beam guiding by an optical fiber, for example optical components such as the wavelength stabilization unit or beam source can be arranged in different parts of the laser tracker. In this regard, the beam source can be integrated for example in the base or a support of the tracker and the stabilization unit can be integrated in a targeting unit (or vice versa). The flexibility with regard to the structural construction of the tracker can be increased as a result.

Regarding the construction of the tracker, furthermore, according to the invention, the laser tracker can have a support pivotable about the vertical axis relative to the base, and the beam directing unit is embodied as a targeting unit pivotable about the inclination axis relative to the support. In such an embodiment, the laser beam can be aligned by means of substantially horizontal (azimuthal) pivoting of the support relative to the base and substantially vertical (elevative) pivoting of the targeting unit relative to the support. Moreover, the measurement beam can be guided in accordance with a change in the position of the reflective target (e.g. retroreflector on a contact sensing tool) by means of such pivoting, provided by servomotors.

According to the invention, in this case the laser diode can be arranged in the targeting unit, wherein the associated space saving (compared with the previous use of gas laser beam sources) can constitute a significant advantage with regard to the constructional design of the laser tracker.

A further aspect of the invention relates to the determination of a precise distance with respect to a target. For this purpose, the laser tracker can additionally have an absolute distance measuring unit for determining a distance with respect to the target, in particular according to the principle of time-of-flight measurement and/or according to the phase measurement principle and/or according to the Fizeau principle. Moreover, a precision distance with respect to the target can be determinable in a manner dependent on the distance determined by means of the absolute distance measuring unit and the change in distance determined by means of the distance measuring unit. By taking account of measurements both by the interferometer and by the distance measuring device (absolute distance measuring device), it is possible for the precise distance with respect to the target to be determined and continuously updated. In this case, the interferometer provides highly accurate distance measurement values. The two distance measuring apparatuses can each have a beam source in particular having different emission wavelengths (e.g. depending on the detector respectively installed).

The invention furthermore relates to the use of a laser diode designed for generating a longitudinally monomode measurement radiation having a defined emission wavelength and a coherence length of at least 10 m, in particular at least 20 m or 50 m, in a distance measuring unit—embodied as an interferometer—of a laser tracker for determining a change in distance with respect to a target by interferometry by means of the measurement radiation that can be generated by the laser diode.

The laser diode or interferometer beam source and the further beam-influencing components (e.g. wavelength stabilization unit) can be present in different embodiments in the context of the invention. In this regard, by way of example, visibly red (e.g. near 633 nm), wavelength-stabilized laser radiation can be generated, wherein a high compatibility with already available system components (e.g. retroreflectors) can be achieved and, moreover, there is no need for an additional visible pointer. The light source and absorption cell (for stabilizing the wavelength) can be spatially separated, e.g. the light source in the telescope of the tracker and connected via a fiber to the absorption cell in the support.

In a further embodiment, the laser diode can be designed for emitting visibly, non-wavelength-stabilized radiation. Such non-stabilized laser radiation can be used for example for the radiation supply in a reference interferometer (together with an absolute distance measuring device). In particular, in this case the exact knowledge of the wavelength present is not required (this can be determined sufficiently accurately in a measurement). Since this has to be constant only for the few milliseconds of an absolute distance measurement, long-term drifts of the wavelength thus do not pose a problem, and a pure wavelength stabilization by means of current and temperature stabilization of the light source is sufficient.

In addition, by means of the reference interferometer, in the time between two measurements of the absolute distance measuring device (e.g. with a measurement rate of 50 Hz), measurements can be carried out with a higher measurement rate (e.g. 1000 Hz), wherein the current interferometer wavelength is determined continuously, e.g. upon each absolute distance measurement, and interpolation is carried out therebetween.

This embodiment can be advantageous with regard to the space requirement for a very compact interferometer light source that can be used in this context. Furthermore, as a subvariant, a non-visible wavelength could therefore be used, an additional visible pointer then being provided.

A further embodiment relates to a configuration of the laser tracker with regard to the measurement radiation such that said radiation has a wavelength optimized for a miniature absorption cell (e.g. Rb, Cs: 780 nm, 795 nm, 852 nm, 894 nm) and is wavelength-stabilized. A significantly smaller space requirement (compared with the red wavelength range) of the optical components can thus be achieved.

Moreover, in the context of a further embodiment, the radiation can have a wavelength in the telecom range or an arbitrary wavelength with a coherence length of a few meters and can be wavelength-stabilized. This embodiment affords in particular space requirement advantages compared with beam sources and stabilization units usable therewith which emit in the red wavelength range.

Furthermore, the invention relates to a method for determining a change in distance with respect to a target by means of interferometry with a laser tracker. In this case, the laser tracker comprises a base defining a vertical axis and a beam directing unit for emitting a measurement radiation and for receiving at least one part of the measurement radiation reflected at the target, wherein the beam directing unit is pivotable in motorized fashion about the vertical axis and an inclination axis, which is substantially orthogonal with respect to the vertical axis, relative to the base. Moreover, provision is made of a distance measuring unit embodied as an interferometer and serving for determining a change in distance with respect to the target by means of interferometry, and an interferometer laser beam source for generating the measurement radiation for the interferometer. Furthermore, the method comprises emitting the measurement radiation, receiving the at least one part of the measurement radiation reflected at the target, and determining the relative distance. In this case, the interferometer laser beam source is embodied as a laser diode and, moreover, the laser diode is embodied in such a way that the measurement radiation is generated in longitudinally monomode fashion with a defined emission wavelength and a coherence length of at least 10 m. In particular, the laser diode can be embodied in such a way that the measurement radiation is generated with a coherence length of at least 20 m, in particular at least 50 m.

The method according to the invention can furthermore comprise the measurement radiation generated by the laser diode being stabilized in such a way that the emission wavelength is present continuously within a defined wavelength range.

BRIEF DESCRIPTION OF THE DRAWINGS

The apparatus according to the invention and the method according to the invention are described in greater detail purely by way of example below on the basis of specific exemplary embodiments that are illustrated schematically in the drawings, further advantages of the invention also being discussed. In the figures, specifically.

DETAILED DESCRIPTION

Figure 1:
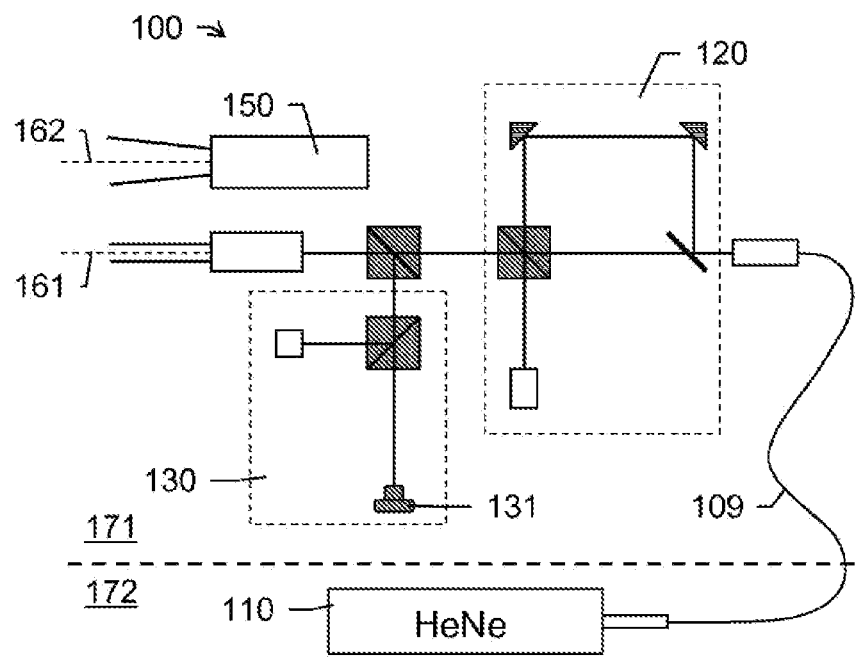
FIG. 1 shows an arrangement of optical components for determining distance and a camera in a laser tracker according to the prior art.

FIG. 1 shows an optical system 100 comprising components for determining distance with a camera 150 in a laser tracker according to the prior art, and a separate HeNe laser light source 110.

An absolute distance measuring device 130 having a laser diode 131 and an interferometer 120 are positioned together with the camera 150, in particular a zoom camera, in such a way that they are moved simultaneously during a movement of the system 100, for example during a pivoting of the entire construction 171 bearing the system 100, and their orientation thus changes jointly. In this case, the camera 150 has a dedicated optical unit having an optical axis 162 running substantially parallel to an optical axis 161 common to the absolute distance measuring device 130 and the interferometer arrangement 120.

The HeNe laser 110, by contrast, is installed separately on a base unit 172, e.g. a support or stationary base, and is not concomitantly moved with the construction 171, but rather makes available to the system 100, in particular to the interferometer 120, a generated measurement radiation by means of an optical waveguide 109.

A distance with respect to a target can be determined by means of the absolute distance measuring device 130, wherein a precise distance with respect to the target and a change in distance can be determined continuously by measurements of the interferometer 120 being taken into account.

Figure 2:
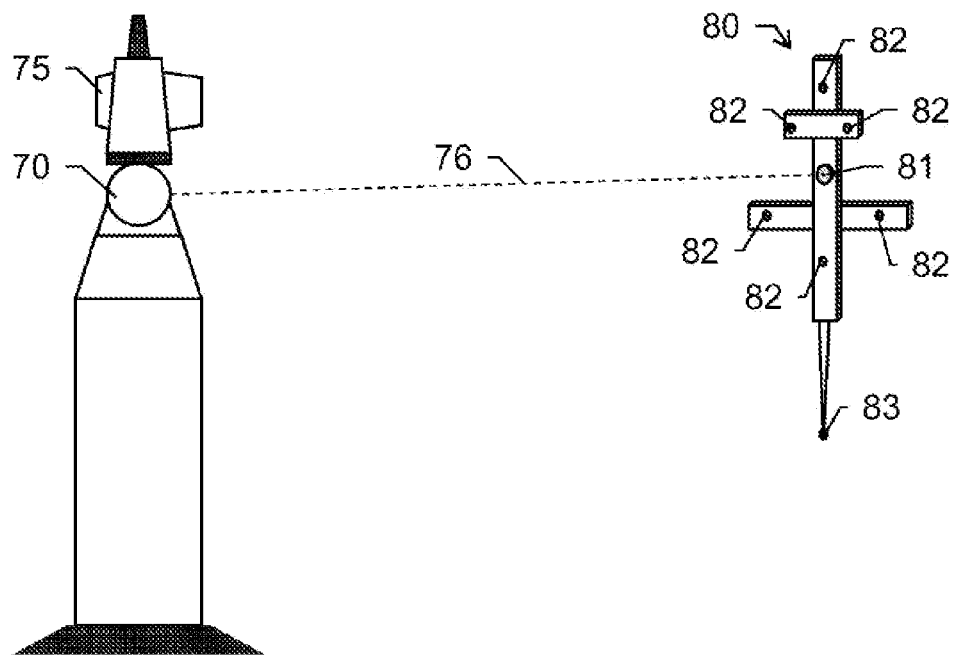
FIG. 2 shows a laser tracker according to the invention comprising an interferometer and a laser diode for generating a measurement radiation for the interferometer.

FIG. 2 shows a laser tracker 70 according to the invention comprising an image detection unit 75 and an auxiliary measuring instrument 80, e.g. a contact sensing tool. For the purpose of determining the position of a sensor exposure on the sensor or in a detected image, the image detection unit 75 has a CMOS or is embodied in particular as a CCD or pixel sensor array camera. Such sensors allow a position-sensitive detection of detected exposure. Furthermore, the auxiliary measuring instrument 80 has a sensor, the contact point 83 of which can be brought into contact with the target object to be measured. While this contact between the contact sensing tool 80 and the target object exists, a position of the contact point 83 in space and thus the coordinates of a point on the target object can be determined exactly. This determination is effected by means of a defined relative positioning of the contact point 83 with respect to the reflector 81 and with respect to the markings 82 arranged on the auxiliary measuring instrument 80, which markings can be embodied as light-emitting diodes, for example. Alternatively, the markings 82 can also be embodied in such a way that, upon illumination, e.g. with radiation having a defined wavelength, said markings reflect the impinging radiation (auxiliary point markings 82 embodied as retroreflectors), in particular exhibit a specific luminous characteristic, or that said markings have a defined pattern or color coding. An orientation of the contact sensing tool 80 can be determined from the position or distribution of the markings 82 in an image detected by means of the sensor of the image detection unit 75.

For determining the position, a measurement laser beam 76 is emitted by the laser tracker 70 in the direction of the reflector 81 arranged on the auxiliary measuring instrument 80, is reflected back from there in a parallel fashion to the tracker 70 and is detected by means of a receiving unit on the tracker 70. The laser tracker 70 has distance measuring means for determining a distance between the tracker 70 and the reflector 81 and goniometers, which make it possible to determine a position of a beam directing unit, by means of which the laser beam 76 can be oriented and guided in a defined manner, and thus a direction of propagation of the laser beam 76. The laser beam 76 can be oriented in particular by means of a pivoting of the beam directing unit, in particular of a targeting unit, in which a beam-guiding optical unit and in particular at least one beam sources can be installed, or a mirror.

For determining the distance from the laser tracker 70 to the reflector 81, an absolute distance measuring device and, in particular for determining changes in distances between tracker 70 and reflector 81, an interferometer are integrated into the tracker 70. The absolute distance measuring device has a first laser diode for generating a measurement radiation and thus makes it possible to determine a distance with respect to the target or reflector 81 e.g. by means of time-of-flight measurement, according to the phase measuring principle or the Fizeau principle. According to the invention, a further measurement radiation is provided to the interferometer by a second laser diode. In this case, said measurement radiation can be emitted at the laser diode in such a way that the radiation enters directly into the interferometer or can be guided to the interferometer by means of an optical waveguide and can be coupled into said interferometer. In this case, the second laser diode is configured such that the measurement radiation that can be generated thereby is single-mode and has a long coherence length, in particular of at least 10 m, preferably of 50 m. For a precise distance determination, measurements by both distance measuring means can be jointly used and combined.

Advantages for such a use of a laser diode with a long coherence length for an interferometer in a laser tracker 70 reside e.g. in the space requirement for the laser diode (which is significantly smaller than that for an HeNe gas laser that constitutes an alternative beam source therefor), in the relatively low energy consumption, in the rapidly producible measurement beam emission of the diode after the activation of the system, and in the possibility of being able to dispense with a high-voltage supply (e.g. required for an HeNe gas laser).

Figure 3:
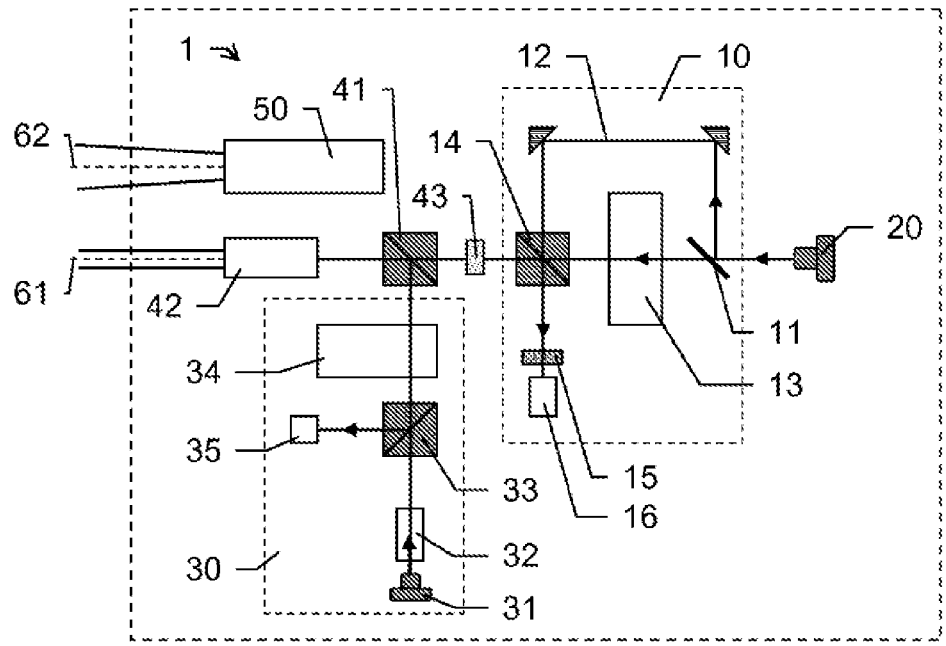
FIG. 3 shows a first embodiment of an arrangement according to the invention of optical components with a laser diode as beam source for an interferometer in a laser tracker.

FIG. 3 shows an arrangement according to the invention of optical components with a laser diode 20 as beam source for an interferometer 10 of an optical system 1 in a laser tracker. Moreover, the system 1 has an absolute distance measuring device 30 (ADM) having a further beam source 31, e.g. a laser diode or an SLED (superluminescent LED), and a camera 50.

The light beam emerging from the beam source 31 of the absolute distance measuring device 30 is guided through an isolator 32 for shielding returning light onto a polarizing beam splitter 33 and from there through an electro-optical modulator 34 to a wavelength-dependent beam splitter 41. Such a beam splitter 41 with wavelength-dependent beam splitting is used in particular in the case of different emission wavelengths of the two light sources 20, 31. The returning light is guided through the polarizing beam splitter 33 onto an ADM detector 35 in the absolute distance measuring device 30. In particular, in this context it is also possible to use other ADM arrangements and methods in which the measurement light beam can be coupled in and out through the wavelength-dependent beam splitter 41, for example. One example of such a distance measuring device is disclosed in WO 03/062744 A1. In principle, other types of ADM, such as e.g. phase measuring devices, can also be used here and in the other embodiments of the invention.

According to the invention, the interferometer 10 uses light that is generated by the laser diode 20. In the embodiment shown, said diode 20 is arranged directly at the system 1, said diode generating a longitudinally monomode laser radiation with a long coherence length (single frequency). The measurement radiation thus generated is split into a reference light path 12 and a measurement light path by a beam splitter 11. The measurement light path leads to an acousto-optical modulator 13 and impinges together with the reference light path on a polarizing beam splitter 14. The polarizing beam splitter 14 guides the measurement radiation further to the wavelength-dependent beam splitter 41 and directs the returning measurement light together with the reference light via a polarization filter 15 to an interferometer detector 16. The method of operation of such an interferometer 10 is fundamentally known and is based on the wave interference principle. In particular, it is also possible to use other interferometer arrangements and methods in which the measurement radiation can be coupled in and out through the wavelength-dependent beam splitter 41, for example. One example of such an interferometer is described in WO 03/062744 A1. In principle, other types of interferometers (e.g. Michelson with quadrature detection) can also be used in other embodiments of the invention.

The optical system 1 furthermore has a λ/4 plate 43 and a component 42, which separate light that is incident in the system 1 from outside along a common optical axis 61 used by the absolute distance measuring device 30 and the interferometer 10, and coupled-out a first part of said light to an overview camera and a second part to a position transducer. The overview camera can have a dedicated optical unit and in addition an image converter. In this case, the overview camera typically has an aperture angle of abound 10° and a focal length of 30-50 mm, for example, and serves for the coarse localization of measurement targets.

For detecting reflective targets, the system can additionally preferably have a reflector illumination with a specific illumination wavelength which illuminates an angular range that is preferably at least equal to the aperture angle of the overview camera.

An evaluation electronic unit and/or evaluation software of the overview camera then detect(s) for example one or more bright light points in the field of view of the overview camera, which in each case correspond to a reflective target. It is possible to ascertain therefrom their position in the image of the overview camera and therefrom in turn a change in the orientation of the target, e.g. of an auxiliary measuring instrument (e.g. contact sensing unit or scanner), whereby the laser tracker or the system 1 and the light beams of the distance measuring device or devices 10, 30 can be aligned with the target. Thus, an automatic target detection and a "lock-on", i.e. a continuous tracking of the target, of the distance measuring devices 10, 30 onto a target can therefore be realized.

The light portion for the position transducer is typically a beam of returning light that was emitted by one of the distance measuring devices 10, 30, preferably by the interferometer arrangement 10. The position transducer can have a dedicated optical unit and, for example, a position-sensitive diode. The latter supplies signals that represent the position of the beam in two dimensions on an area of the position-sensitive diode. In particular, for this purpose it is also possible to use sensor arrays or image converters (e.g. CCD or CMOS) with an assigned digital signal processing for position determination. A control unit can control an alignment of the laser tracker in accordance with the ascertained position such that the measurement beam follows a movement of the reflective target.

Moreover, the camera 50 can detect markings of a target with the integrated image converter. On the basis of the imaging of the markings, the orientation of the target is ascertained e.g. by means of image processing, wherein the zoom factor of the camera 50 can additionally be controlled such that the imaging of the target onto the image converter substantially always has the same size. For this purpose, the camera can have for example a 10-fold zoom with a focal length of 50 to 500 mm magnification.

Figure 4:
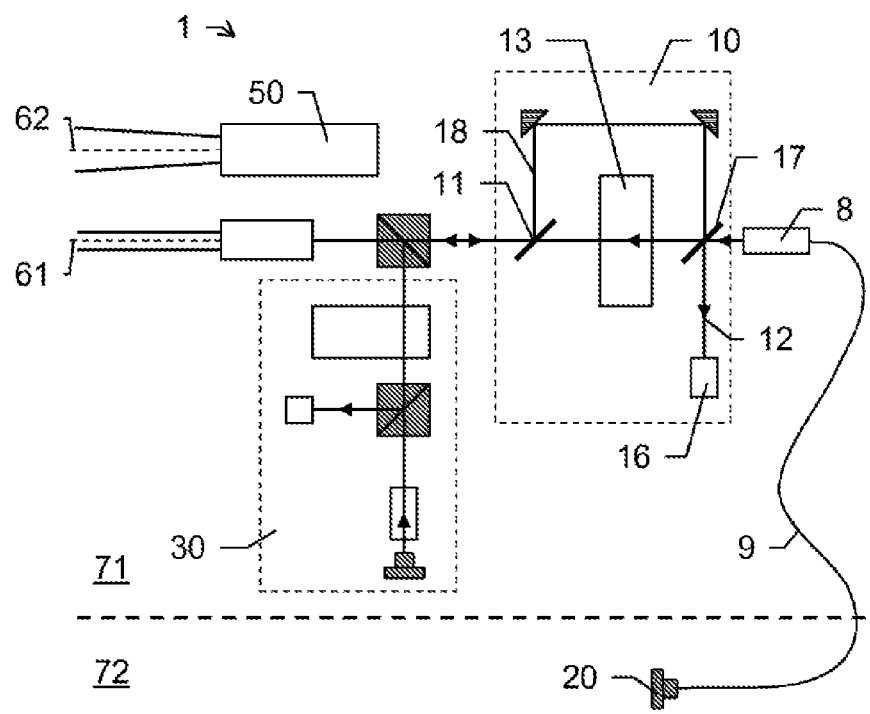
FIG. 4 shows a further embodiment of a measuring optical unit according to the invention of a laser tracker comprising a laser diode as beam source for an interferometer and an optical waveguide.

FIG. 4 shows a further embodiment of a measuring optical unit 1 according to the invention of a laser tracker comprising a laser diode 20 as beam source for an interferometer 10 and an optical waveguide 9. In this case, the laser diode 20 is once again provided for generating the measurement radiation for the interferometer 10 of the laser tracker. A zoom camera 50 is additionally provided.

In this case, the laser diode 20 is embodied in such a way that a measurement radiation with a high coherence length, in particular a coherence length of at least 10 m and a line width of less than 1 MHz, can be generated therewith. For this purpose, the laser diode has a wavelength-selective device, e.g. a periodic structure (optical grating) of the active laser medium, a grating outside the active medium but installed on the same chip, or a grating structure in the external fiber 9, which has the effect that the emitted laser radiation is present in longitudinally monomode fashion and thus with a specific narrow line width (single-mode laser). Furthermore, the suitable beam characteristic can be generated by means of a highly stable, external cavity or by means of a holographic grating in conjunction with the diode 20.

The laser diode 20 in accordance with the configuration described above advantageously has an emission wavelength of 633 nm (visible red spectral range) which is linearly polarized, is single-mode and has a coherence length of at least 10 m. In this case, the emission power of the radiation is above 0.5 mW with a great wavelength stability over the entire lifetime (<0.3 ppm) of the diode 20.

In particular on the basis of the radiation that can thus be generated with the wavelength of 633 nm, the measurement beam can simultaneously be used as a pointing beam, as a result of which it is possible to dispense with an additional beam source for visually marking points.

The radiation generated by the laser diode 20 is coupled into the interferometer 10 by means of the optical waveguide 9. For this purpose, provision is furthermore made of a collimator 8 for connecting the fiber 9 to the interferometer 10. The construction of the interferometer 10 is similar to that of the described embodiment according to the invention in accordance with FIG. 3, but here the reference path 12 is guided by means of a steel splitter 17 onto the detector 16 and the measurement path 18 is guided by means of the steel splitter 11. Moreover, the acousto-optical modulator 13 is provided for frequency variation and as an optical isolator. Furthermore, the laser tracker has an absolute distance measuring device 30 having generically typical optical components (beam source, detector, isolator, etc.).

The laser tracker has two separate units 71, 72. The camera 50, the absolute distance measuring device 30 and the interferometer 10 are arranged together with further, in particular beam-guiding, components on a beam directing unit 71. This beam directing unit 71 can be embodied differently depending on the embodiment of the laser tracker, e.g. as a structurally integral targeting unit or as a beam guiding unit (e.g. rotatable mirror) with a measuring unit having the absolute distance measuring device 30 and the interferometer 10. Furthermore, the beam directing unit 71 can be embodied as movable, in particular pivotable about two axes, independently of an alignment or orientation of a base unit 72. As a result of such a separation—as realized in the embodiment shown—the laser diode 20 embodied as an interferometer beam source can be present in the base unit 72, the generated radiation can be coupled into the beam directing unit 71 by means of the optical fiber 9 and the alignment of the beam directing unit 71 or of the optical axes 61, 62 of the camera 50 and of the distance measuring devices 10, 30 relative to the base 72 can be varied.

In particular, as a result of this structural separation, a space requirement needed in the beam directing unit 71 for the components required can be reduced, since the laser diode 20 and possible supply and control components for said laser diode can be transferred from the beam directing unit 71 into the base 72.

Figure 5:
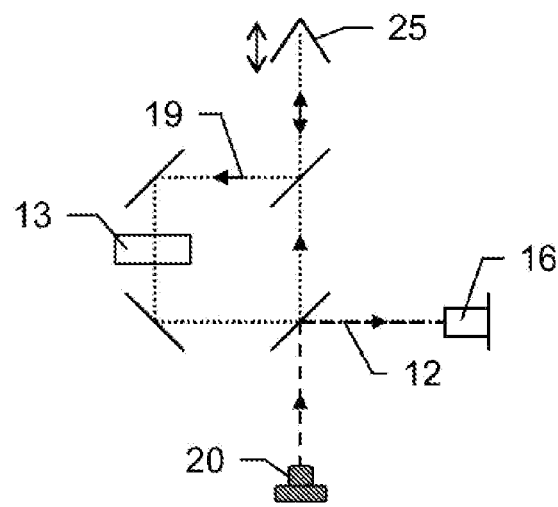
FIG. 5 shows a construction according to the invention of an interferometer arrangement with laser diode for a laser tracker.

FIG. 5 shows a basic construction according to the invention of an interferometer arrangement with laser diode 20 for a laser tracker. By means of the laser diode, a (longitudinally) monomode measurement radiation with a coherence length of at least 10 m, preferably 50 m, is generated, which radiation is guided by means of beam splitters firstly on a reference path 12 and secondly on a return path 19. The radiation is directed onto a reflective target 25 and reflected there. Moreover, an acousto-optical modulator 13 is arranged in the return path 19. In this case, the target 25 constitutes a movable target 25, wherein a change in distance with respect to the interferometer can be ascertained and measured by means of the interferometer detector 16. For this purpose, the reference radiation and the measurement radiation are superimposed on the interferometer detector 16, as a result of which these beams interfere and allow measurement values to be read out.

Figure 6:
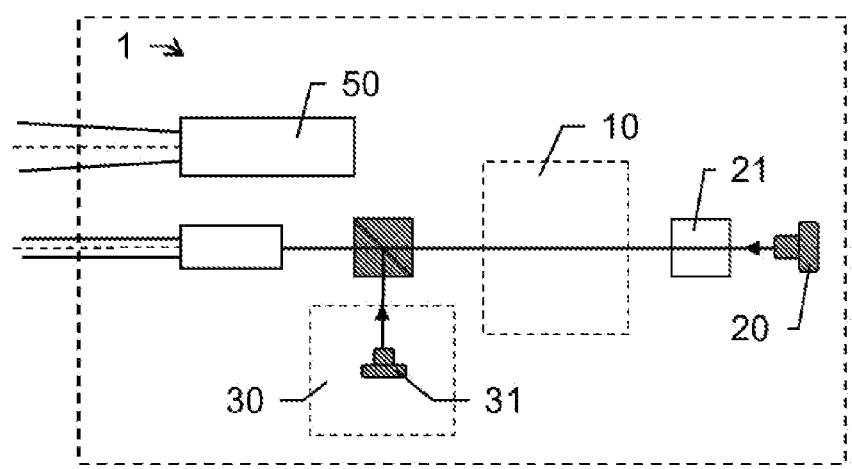
FIG. 6 shows a further embodiment of a measuring optical unit according to the invention of a laser tracker comprising a laser diode with wavelength stabilization unit for generating a measurement radiation for an interferometer.

FIG. 6 shows a further embodiment of a measuring optical unit 1 according to the invention of a laser tracker comprising a laser diode 20 as interferometer beam source for generating a measurement radiation for an interferometer 10 with a wavelength stabilization unit 21. Moreover, once again an absolute distance measuring device 30 having a further light source 31, preferably embodied as a laser diode or SLED, and a camera 50 are provided.

The wavelength stabilization unit 21 is used to realize a stabilization of the measurement radiation to a wavelength standard, e.g. to an absorption line (e.g. using an iodine cell) of approximately 633 nm. In general, the wavelength stabilization unit 21 can have a gas cell for the purpose of stabilization. In particular, different stabilization approaches can be used for the purpose of stabilization, thus e.g. synchronous detection (modulation of the optical frequency around a central absorption line), "side of line" method or stabilization by means of the Zeeman effect at constant optical frequency (with magnetic modulation). In this case, the "side of line" method is based on a stabilization by means of absorption with an absorption value corresponding to the maximum gradient of a corresponding absorption line of a gas cell (e.g. stabilization with approximately 40% absorption).

For such a stabilization, the laser diode 20 provides light having a wavelength range that is tunable in a mode-hop-free manner, such that it is possible to effect tuning to the desired absorption line in terms of wavelength. The generated laser light additionally has a long coherence length (at least 10 m, in particular 50 m).

Figure 7:
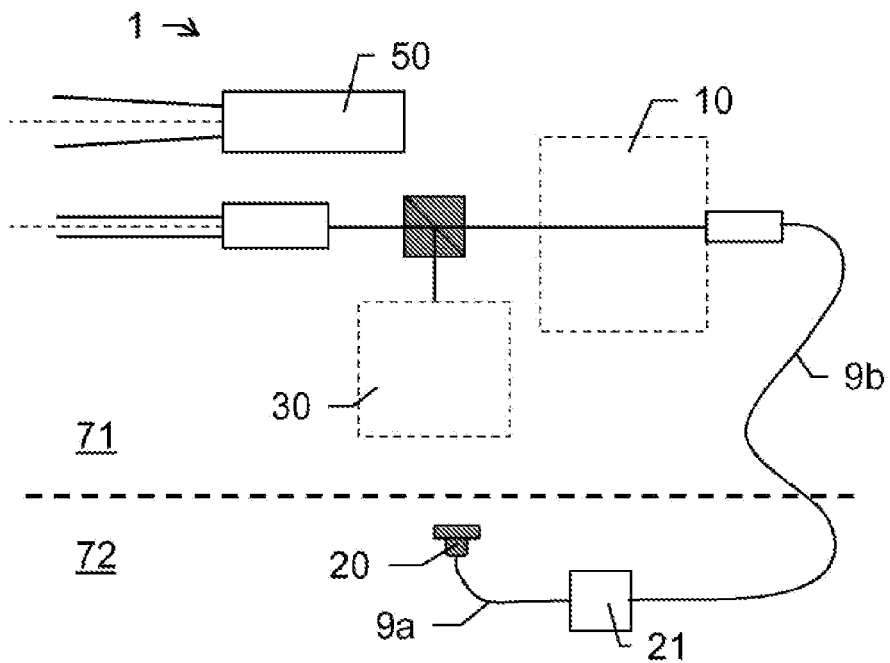
FIG. 7 shows a further embodiment of a measuring optical unit according to the invention of a laser tracker comprising a laser diode, a wavelength stabilization unit and optical waveguides.

FIG. 7 shows a further embodiment of a measuring optical unit 1 according to the invention of a laser tracker comprising a laser diode 20 for generating a measurement radiation for an interferometer 10, a wavelength stabilization unit 21 and optical waveguides 9a, 9b for guiding the laser radiation. The single-mode laser radiation generated by the diode 20 is guided to the wavelength stabilization unit 21 by means of the optical fiber 9a. Said stabilization unit 21 has the effect that the wavelength of the laser radiation is largely kept constant. The radiation stabilized in this way is guided by a further optical fiber 9b from the wavelength stabilization unit 21 toward the interferometer 10. On the basis of the measurement radiation thus generated with a high coherence length and wavelength stability, measurements of changes in distance can be carried out with high precision by means of the interferometer 10.

Together with distance measurements of the absolute distance measuring device 30, very accurate distance determinations and detections of changes in distance with respect to a target are available with a laser tracker embodied in this way. Analogously to an embodiment in accordance with FIG. 4, a spatial and in particular structural separation of the laser diode 20 and the wavelength stabilization unit 21 from the distance measuring means 10, 30 and the camera 50 of the laser tracker is achieved by virtue of the two units 71, 72 being connected by means of the optical fiber 9b.

Figure 8:
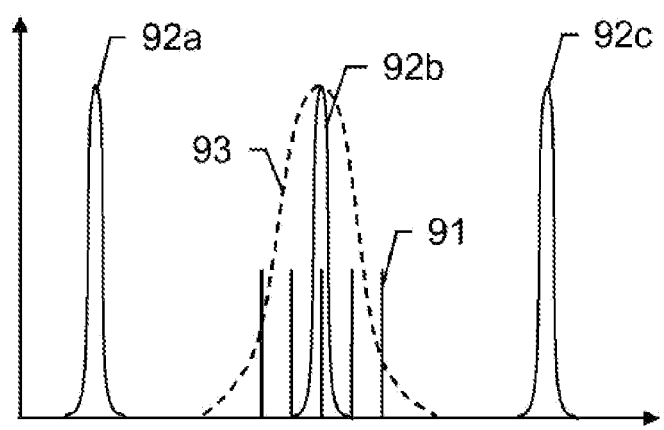
FIG. 8 shows a schematic illustration for generating the measurement radiation with a laser diode provided in a laser tracker according to the invention and having a wavelength-selective component.

FIG. 8 shows a schematic illustration for generating the measurement radiation with a laser diode provided in a laser tracker according to the invention and having a wavelength-selective component.

A laser diode typically has a gain medium (laser medium) having a bandwidth of a few nanometers and a laser resonator. On the basis of the resonator length, which is typically of the order of magnitude of a maximum of a few millimeters as a result of the spatial dimensioning of such a diode, a spacing of resonator modes 91 that can be generated by the diode in the sub-nanometers range is thus defined. This has the consequence that a plurality of modes 91 can lase simultaneously, that is to say that laser radiation having a plurality of modes 91 (multimode) is generated.

In the context of the present invention, laser diodes are used in conjunction with an additional wavelength-sensitive device. As a result, a wavelength-dependent optical feedback can be generated, as a result of which said device acts like an additional resonator having other modes 92a-c.

What is achieved by means of such an arrangement is that "lasing" is possible, i.e. laser radiation is generated, only at those frequencies at which firstly the laser-based light amplification is effected (cf. gain profile 93 of such a laser diode) and a mode 91 of the laser resonator and a mode 92a-c of the additional optical feedback device (wavelength-selective device) are present simultaneously (at the same frequency). A single mode 91 of the laser resonator is selected as a result. The effect of a wavelength-selective device having a significantly longer resonator length than the resonator length of the diode is shown. Only a mode 92b defined by the device within the gain range arises as a result.

An alternative solution (not illustrated here) would also be conceivable wherein a shorter external resonator is used, such that the mode spacing thereof is comparable to that of the laser diode. With the condition that the sharpness of the modes thus defined is good enough and that the modes are not exactly identical in both resonators, in this case as well it is possible for there to be only a common mode in the gain range and thus for single-mode operation to be achieved.

It goes without saying that these illustrated figures merely schematically illustrate possible exemplary embodiments. According to the invention, the various approaches can likewise be combined with one another and also with interferometry methods for measuring changes in distance, with methods for determining distance and with generic measuring instruments, in particular laser trackers, from the prior art. The aspects according to the invention can also be employed in geodetic surveying instruments—such as total stations and tachymeters.

What is claimed is:

1. A laser tracker for continuously tracking a reflective target and for determining distance with respect to the target comprising:
   a base defining a vertical axis;
   a beam directing unit for emitting a measurement radiation and for receiving at least one part of the measurement radiation reflected at the target, wherein the beam directing unit is pivotable in motorized fashion about the vertical axis and an inclination axis, which is substantially orthogonal with respect to the vertical axis, relative to the base;
   a distance measuring unit embodied as an interferometer and serving for determining a change in distance with respect to the target by means of interferometry;
   an interferometer laser beam source for generating the measurement radiation for the interferometer; and
   an angle measuring functionality for determining an orientation of the beam directing unit relative to the base;
   wherein the interferometer laser beam source is embodied as a laser diode and the laser diode has a wavelength-selective component arranged in such a way that the measurement radiation is configured to be generated in longitudinally monomode fashion with a defined emission wavelength and with a coherence length of at least 10 m, wherein the coherence length of at least 10 m is configured to be determined by means of the interferometer.

2. The laser tracker according to claim 1, wherein:
the laser diode has a first resonator unit, which defines a number of laser modes which arise jointly,
the wavelength-selective component is embodied in such a way that it acts as a second resonator unit to extract a principal laser mode from the number of laser modes by means of an interaction of the wavelength-selective component with the laser diode, and
a diode radiation is configured to be emitted as longitudinally monomode measurement radiation having only the principal laser mode, such that the emission wavelength and the coherence length of the measurement radiation are defined,
wherein the wavelength-selective component is embodied as an optical grating.

3. The laser tracker according to claim 1, wherein the laser diode is embodied as laser selected from the list consisting of:
a distributed feedback laser,
a distributed Bragg reflector laser,
a fiber Bragg grating laser,
an external cavity diode laser,
a diode pumped solid state laser,
a discrete mode laser, and
a microchip laser.

4. The laser tracker according to claim 1, wherein the emission wavelength of the measurement radiation is between 600 nm and 700 nm.

5. The laser tracker according to claim 1, wherein the laser tracker has a control unit, and the laser diode is embodied in such a way that the emission wavelength of the measurement radiation is variable in longitudinally monomode fashion within a specific emission wavelength range, wherein the emission wavelength is variable in a manner controlled by the control unit as a result of a change in the temperature of the laser diode and/or a change in an electric current present at the laser diode.

6. The laser tracker according to claim 5, wherein the laser diode is configured to be driven by means of the control unit in such a way that an emission power of the measurement radiation is variable.

7. The laser tracker according to claim 1, wherein the laser tracker has a wavelength stabilization unit for stabilizing the measurement radiation generated by the laser diode, such that the emission wavelength is present continuously within a defined wavelength range, wherein the wavelength stabilization unit is embodied as an absorption cell, wherein the laser tracker has an optical connecting fiber for connecting the wavelength stabilization unit to the interferometer laser beam source.

8. The laser tracker according to claim 1, wherein the laser tracker has at least one optical fiber, wherein the measurement radiation is configured to be guided by means of the optical fiber to the interferometer, wherein the measurement radiation generated by the laser diode is coupled into the optical fiber.

9. The laser tracker according to claim 1, wherein the measurement radiation is configured to be coupled into the beam directing unit by means of an optical fiber.

10. The laser tracker according to claim 1, wherein the laser tracker has a support pivotable about the vertical axis relative to the base.

11. The laser tracker according to claim 1, wherein the laser tracker additionally has an absolute distance measuring unit for determining a distance with respect to the target, according to the principle of time-of-flight measurement and/or according to the phase measurement principle and/or according to the Fizeau principle.

12. The laser tracker as claimed in claim 11, wherein a precision distance with respect to the target is configured to be determined in a manner dependent on the distance determined by means of the absolute distance measuring unit and the change in distance determined by means of the distance measuring unit.

13. The laser tracker according to claim 1, wherein the emission wavelength of the measurement radiation is between 630 nm and 635 nm.

14. The laser tracker according to claim 1, wherein the emission wavelength of the measurement radiation is between 850 nm and 900 nm.

15. The laser tracker according to claim 1, wherein the emission wavelength of the measurement radiation is between 850 nm and 855 nm.

16. The laser tracker according to claim 1, wherein the emission wavelength of the measurement radiation is between 892 nm and 896 nm.

17. A distance measuring unit, comprising:
a laser diode designed for generating a longitudinally monomode measurement radiation with:
a defined emission wavelength; and
a coherence length of at least 10 m;
wherein the distance measuring unit is embodied as an interferometer of a laser tracker for determining a change in distance with respect to a target by interferometry by means of the measurement radiation generated by the laser diode.

18. A method for determining a change in distance with respect to a target by means of interferometry with a laser tracker, wherein the laser tracker includes:
a base defining a vertical axis,
a beam directing unit for emitting a measurement radiation and for receiving at least one part of the measurement radiation reflected at the target, wherein the beam directing unit is pivotable in motorized fashion about the vertical axis and an inclination axis, which is substantially orthogonal with respect to the vertical axis, relative to the base,
a distance measuring unit embodied as an interferometer and serving for determining a change in distance with respect to the target by means of interferometry, and
an interferometer laser beam source for generating the measurement radiation for the interferometer, and
wherein the method comprises:
emitting the measurement radiation,
receiving the at least one part of the measurement radiation reflected at the target,
and
determining the relative distance,
wherein the interferometer laser beam source is embodied as a laser diode and the laser diode has a wavelength-selective component arranged in such a way that the measurement radiation is generated in longitudinally monomode fashion with a defined emission wavelength and with a coherence length of at least 10 m.

19. The method as claimed in claim 18, wherein the measurement radiation generated by the laser diode is stabilized in such a way that the emission wavelength is present continuously within a defined wavelength range.

* * * * *